US009651445B2

(12) United States Patent
McIntyre

(10) Patent No.: US 9,651,445 B2
(45) Date of Patent: May 16, 2017

(54) FLUID PIPELINE LEAK DETECTION AND LOCATION WITH MINIATURE RF TAGS

(71) Applicant: UT-Battelle, LLC, Oak Ridge, TN (US)

(72) Inventor: Timothy J. McIntyre, Farragut, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 49 days.

(21) Appl. No.: 14/228,610

(22) Filed: Mar. 28, 2014

(65) Prior Publication Data

US 2014/0306809 A1  Oct. 16, 2014

Related U.S. Application Data

(60) Provisional application No. 61/811,931, filed on Apr. 15, 2013.

(51) Int. Cl.
*G01M 3/00* (2006.01)
*G06K 7/00* (2006.01)
*G01M 3/28* (2006.01)

(52) U.S. Cl.
CPC .......... *G01M 3/005* (2013.01); *G01M 3/2807* (2013.01); *G06K 7/00* (2013.01)

(58) Field of Classification Search
CPC ...... G01M 3/00; G01M 3/005; G01M 3/2807; G01M 3/243; G01M 3/246; G01M 3/26; G01M 3/28; G01M 3/2823; G06K 7/00; G01F 1/00; G01F 3/00
USPC ....... 340/850, 870.01, 500, 505, 539.1, 540, 340/541, 550, 572.1, 572.8, 603, 604,
(Continued)

(56) References Cited

U.S. PATENT DOCUMENTS

| 5,416,724 | A  | 5/1995 | Savic |
| 6,453,247 | B1 | 9/2002 | Hunaidi |
| 7,475,596 | B2 | 1/2009 | Hunaidi et al. |

(Continued)

FOREIGN PATENT DOCUMENTS

| GB | 702956  | 3/2007 |
| GB | 2435329 | 8/2007 |

(Continued)

OTHER PUBLICATIONS

Kim, Jong-Hoon et al., SPAMMS: A Sensor-based Pipeline Autonomous Monitoring and Maintenance System, Communication Systems and Networks (COMSNETS), 2010 Second International Conference on Jan. 5-9, 2010.

(Continued)

*Primary Examiner* — Brian Wilson
(74) *Attorney, Agent, or Firm* — Colin L. Cini

(57) ABSTRACT

Sensors locate troublesome leaks in pipes or conduits that carry a flowing medium. These sensors, through tailored physical and geometric properties, preferentially seek conduit leaks or breaches due to flow streaming. The sensors can be queried via transceivers outside the conduit or located and interrogated inside by submersible unmanned vehicle to identify and characterize the nature of a leak. The sensors can be functionalized with other capabilities for additional leak and pipeline characterization if needed. Sensors can be recovered from a conduit flow stream and reused for future leak detection activities.

11 Claims, 6 Drawing Sheets

(58) Field of Classification Search
USPC ............... 340/605, 607, 608, 609, 610, 5.1, 340/10.1–10.6
See application file for complete search history.

(56) References Cited

U.S. PATENT DOCUMENTS

| | | | |
|---|---|---|---|
| 7,523,666 B2* | 4/2009 | Thompson et al. ............ 73/592 |
| 2003/0160391 A1* | 8/2003 | McEwan ............... F16L 55/162 |
| | | | 277/314 |
| 2004/0025607 A1* | 2/2004 | Rantala et al. .............. 73/866.5 |
| 2004/0212510 A1* | 10/2004 | Aronstam ............... E21B 47/12 |
| | | | 340/606 |
| 2009/0224915 A1* | 9/2009 | Angell .................... G06Q 10/06 |
| | | | 340/572.1 |
| 2010/0064775 A1 | 3/2010 | Ben-Mansour |
| 2011/0253373 A1* | 10/2011 | Kumar ................... E21B 21/00 |
| | | | 166/306 |
| 2012/0067447 A1* | 3/2012 | Ryan ....................... E21B 29/10 |
| | | | 138/97 |

FOREIGN PATENT DOCUMENTS

| | | |
|---|---|---|
| JP | 2006337098 | 12/2006 |
| JP | 2007163255 | 6/2007 |
| KR | 1020090067303 | 6/2009 |
| WO | 2008028746 | 3/2008 |

OTHER PUBLICATIONS

Yong-Jun, Du, The Research of Leak Detection Technique of Oil Pipeline Based on RFID, Science Technology and Engineering, Sep. 2010.

Chen, Xubing, Passive Ultrasonic RFID Localization for Pipeline Pigs, Lecture Notes in Computer Science, 2009, vol. 5928/2009, pp. 279-287.

* cited by examiner

FLUID PIPELINE LEAK DETECTION AND LOCATION WITH MINIATURE RF TAGS

CROSS-REFERENCE TO RELATED APPLICATIONS

This application claims priority to U.S. provisional patent application Ser. No. 61/811,931, filed 15 Apr. 2013 (15.04.2013), which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

THE NAMES OF THE PARTIES TO A JOINT RESEARCH AGREEMENT

None.

BACKGROUND OF THE INVENTION

1. Field of the Invention

The present disclosure relates to sensors and more particularly to sensors and methods for locating a breach in a fluid-carrying conduit such as a pipeline.

2. Description of the Related Art

There are over 52,000 municipal water systems in the United States alone. Many of these systems are 100 years old or more and are experiencing large losses in the delivery of water due to infrastructure degradation. This so called "non-revenue water" can reduce system throughput by as much as 40% or more. A new business opportunity exists for a company that can quickly identify compromised water systems, and repair and maintain them for less than the expense of production of non-revenue water supplies.

Several approaches have been attempted to identify and locate municipal water line leaks. In general, there are two primary methodologies for identifying leakage including aerial surveillance and pipeline inspection gauges (pigs). For aerial surveys, LiDAR mapping and high resolution videography are typically employed. In the case of pipeline pigs, several technologies have been applied including acoustic tomography, laser scanning or structured lighting, video imaging and even neutron tomography. For tunnel systems that are not near the surface or are covered by urban clutter, aerial surveillance is ineffective. Furthermore, methods employing pipeline pigs also provide sub-optimal performance due to the conditions within the water tunnel (e.g. water turbidity, presence of debris, complex pipeline geometries and size, etc.), or, in the case of neutron tomography, is exceedingly expensive.

What is needed is a low-cost system and method for inspecting conduits to determine if a breach is present and, if so, locate the breach.

BRIEF SUMMARY OF THE INVENTION

Disclosed are examples of a breach detection and location system and methods of detecting and locating breaches in a fluid-carrying conduit. Brief descriptions are provided here and more detailed descriptions follow. The term breach includes all leaks, openings, cracks, holes, gaps, misalignments, ruptures, breaks, separations, collapses, and other structural or assembly flaws that will allow a fluid medium (liquid or gas) to escape from a conduit such as a pipe, tube, vessel, duct, or the like.

In one example, a breach detection and location system includes a plurality of uniquely identifiable Radio Frequency (RF) identification tags for introducing into an upstream point of a conduit that carries a fluid medium. A first transceiver is disposed on the outside of the conduit at a location that is proximate to the upstream point. A second transceiver is disposed on the outside of the conduit at a location that is proximate to a downstream point, with the downstream point being located downstream of the upstream point in the direction that the fluid medium flows. Each of the uniquely identifiable RF tags communicate individually with the first transceiver at a first time but only the uniquely identifiable RF tags that do not encounter a breach in the conduit communicate with the second transceiver at a later time.

In yet another example, a method of detecting and locating a breach in a conduit carrying a flowing medium comprises the steps of: a) locating a first transceiver on the outside of the conduit at a location that is proximate to an upstream point; b) locating a second transceiver on the outside of the conduit at a location that is proximate to a downstream point, the downstream point being located downstream of the upstream point in the direction that the medium flows; c) introducing a plurality of uniquely identifiable Radio Frequency (RF) tags into the flowing medium at the upstream point; d) communicating with said plurality of uniquely identifiable Radio Frequency (RF) tags with said first transceiver at a first time; e) communicating with those uniquely identifiable Radio Frequency (RF) tags that pass through the conduit without encountering a breach with said second transceiver at a second time that is later than the first time; and f) comparing the communications of steps d) and e) to determine if any of the plurality of uniquely identifiable Radio Frequency (RF) tags are not present at the downstream point.

These and other examples will now be described in greater detail below.

BRIEF DESCRIPTION OF THE SEVERAL VIEWS OF THE DRAWINGS

The system and method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE INVENTION

Figure 1:
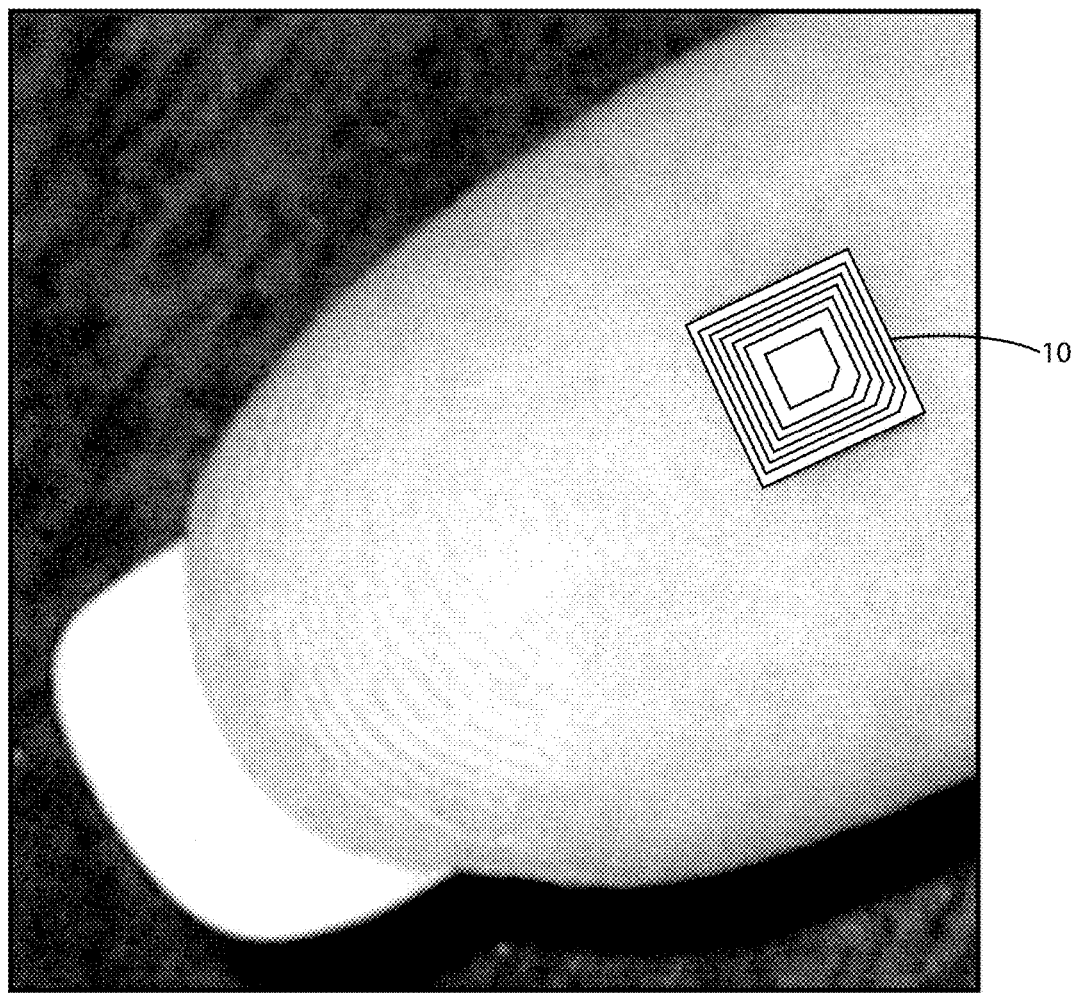
FIG. 1 illustrates an exemplary RF ID sensor in relation to the size of a typical human index finger.

This disclosure describes systems and methods for conduit leak detection and leak location using miniature wireless radio frequency (RF) identification (ID) sensors RF or RF ID sensors as they are commonly referred to. These wireless sensors leverage the tremendous advancements that have taken place in the RF tagging and tracking industries such as packaging and clothing for example. FIG. 1 shows a commercially available RF tag 10 that sells for less than ten cents per unit. Exemplary RF tags and other equipment used in this system are available from OMEGA Engineering, Inc. Stamford, Conn. 06907-0047.

Figure 2:
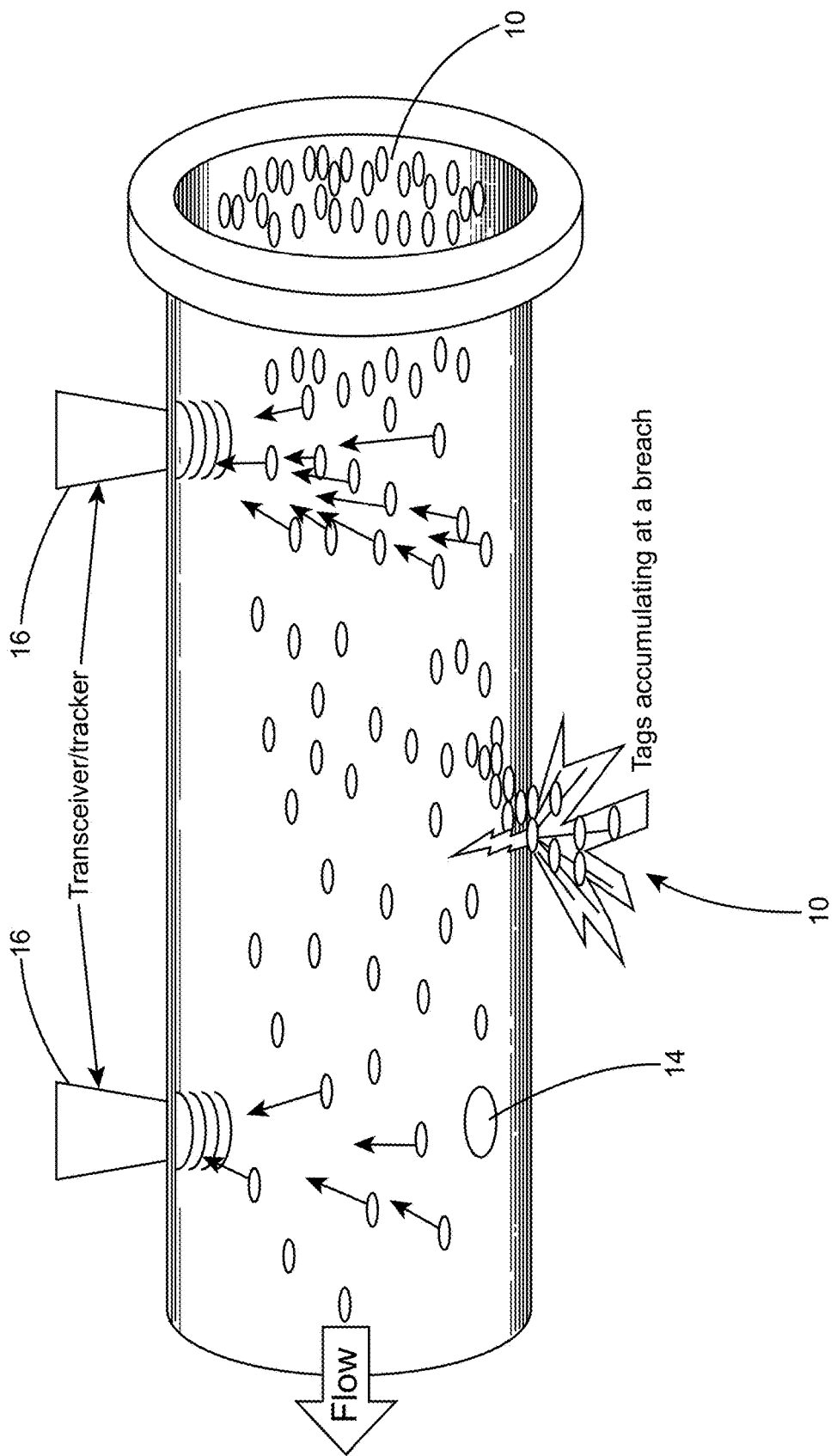
FIG. 2 illustrates an exemplary breach detection and location system.

These RF tags 10 can be used directly for detection and location purposes or functionalized by integrating them with other sensors 12 such as pH sensors, temperature sensors and the like. Furthermore, unique packaging concepts also allow the tags/sensors to exhibit tailored buoyancy characteristics or surface properties. Conduits, such as pipelines, carry liquid, solid, and/or gaseous mediums from one location to another and are often difficult to inspect, because they are buried beneath the ground. RF tags 10 or sensor pods 14 (functionalized tags), can be introduced into a municipal water system pipeline of interest, for example, for inspection as shown in the schematic illustration of FIG. 2.

As the RF tags 10 and/or sensor pods 14 move down the conduit (e.g., pipeline, cistern, closed channel, etc. . . . ) the population is monitored with one or more transceivers 16 as shown. For breach detection and location, a population of simple RF tags 10 can be employed. Since each tag has a unique ID associated with it, the tag population can be carefully monitored with the transceivers 16 to determine the location of all the tags 10. If the tag population decreases over a section of conduit, the missing tag population and their individual IDs are noted. This indicates that the RF tags 10 are either accumulating at an obstruction within the conduit, or exiting the conduit through a breach. The time differential between when an RF tag 10 communicates with a first transceiver 16 and a second transceiver 16 can be monitored by a timing device to aid in calculating fluid flow rate. After the population of RF tags 10 has passed a tracking transceiver 16 and some RF tags 10 are noted as missing, an RF tag location system, or pipeline inspection gauge (pig) having a third transceiver 16 may be launched down the section of conduit to locate and pinpoint the exact position of the missing tags 10. In another embodiment, the transceivers 16 interrogate the missing tags 10 from outside the conduit, either directly affixed to the conduit, or disposed adjacent to or proximate to the conduit. A timing device may monitor the times that an individual RF tag 10 communicates with a first transceiver 16 and a second transceiver 16 for use in calculating fluid flow rates.

Figure 3:
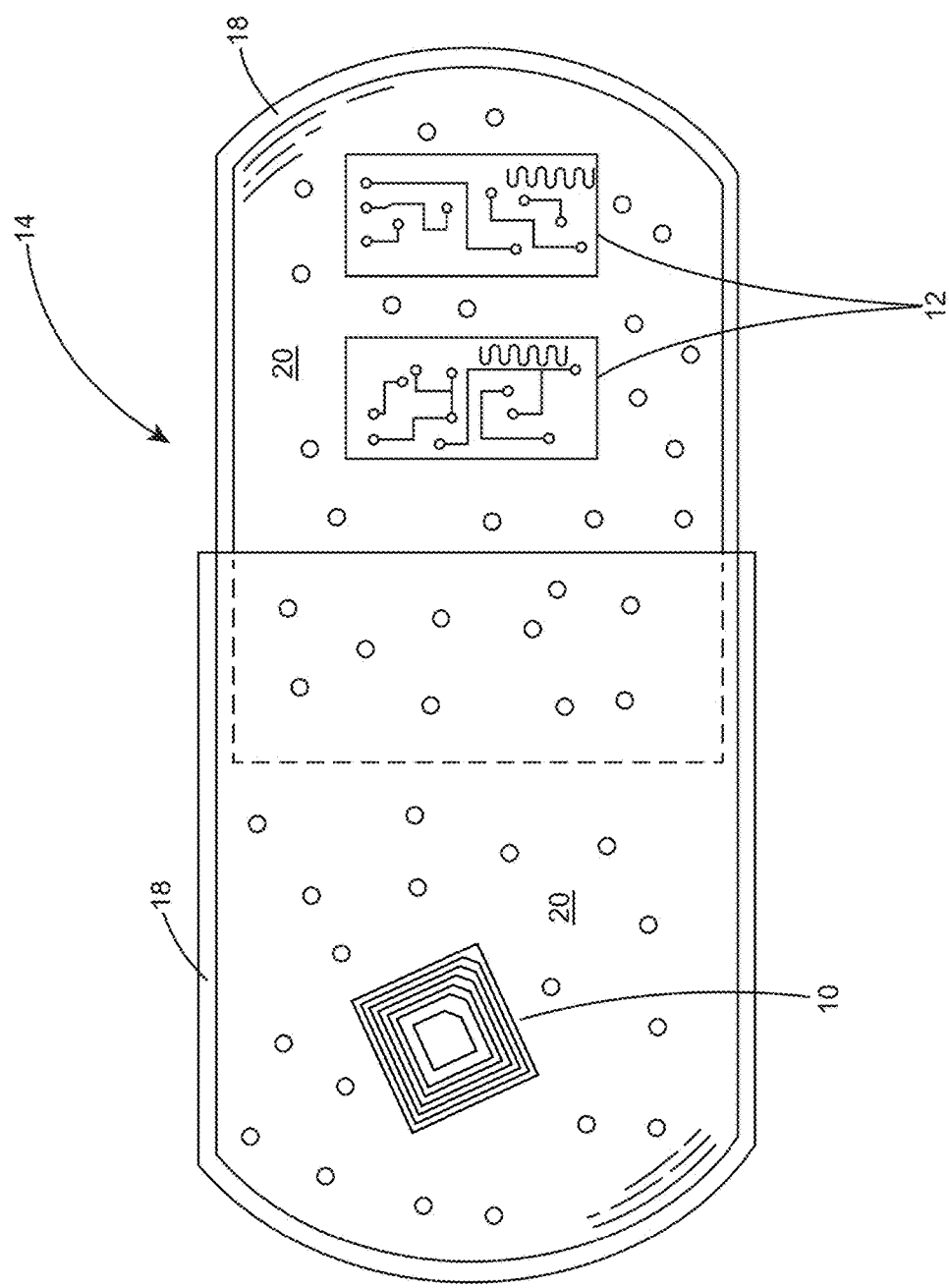
FIG. 3 illustrates an exemplary, two-piece, sensor pod.

In addition to miniature RF tags 10 described above, functionalized tags, or sensor pods 14 provide the capability to perform measurements for characterizing the fluid in the conduit in real time. Sensor 12 measurements include flow velocity, bulk flow rate, turbidity, pH, and temperature, for example. When RF tags 10 and other sensors 12 are integrated as illustrated in FIG. 3, a packaging material is utilized to form an outer casing 18. Packaging can be formed of plastic material to create an outer casing 18 shaped like a vitamin capsule as shown in the example. The casing 18 halves may be removable or permanently affixed to one another. The packaging adds unique features to the sensor pod 14 including tailored size, buoyancy, and the ability to agglomerate or cluster. Tailored size is useful for differentiating between small and larger breaches as smaller pods 14 may exit through a certain size breach while larger pods 14 will not. With the unique ID that each RF tag 10 contains, the size of the pods 14 that pass through the breach versus those pods 14 that are lodged within the breach can be readily determined. This ability will allow the engineer to effectively approximate the size of a breach in the conduit.

Figure 4:
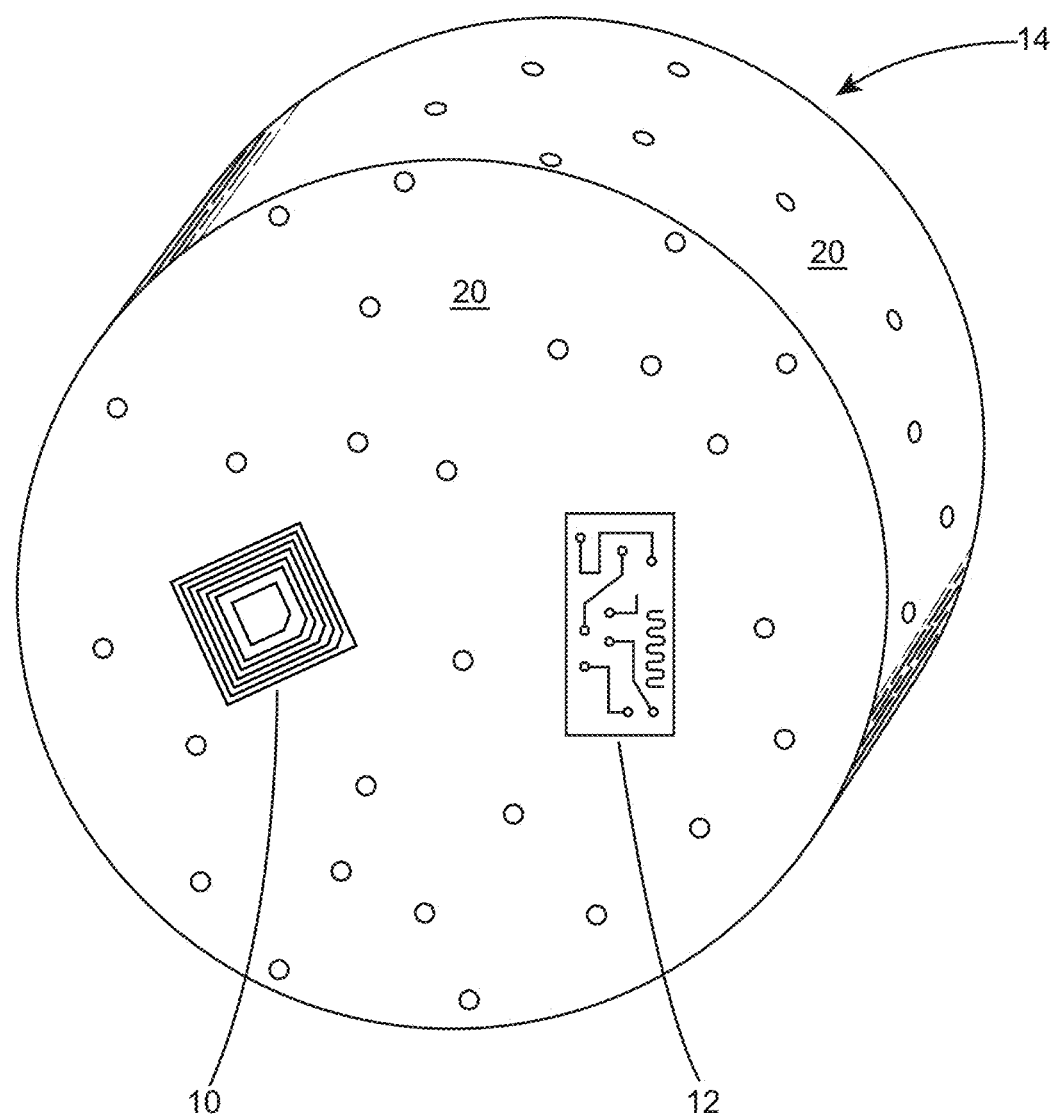
FIG. 4 illustrates an exemplary, one-piece, sensor pod.
Figure 5:
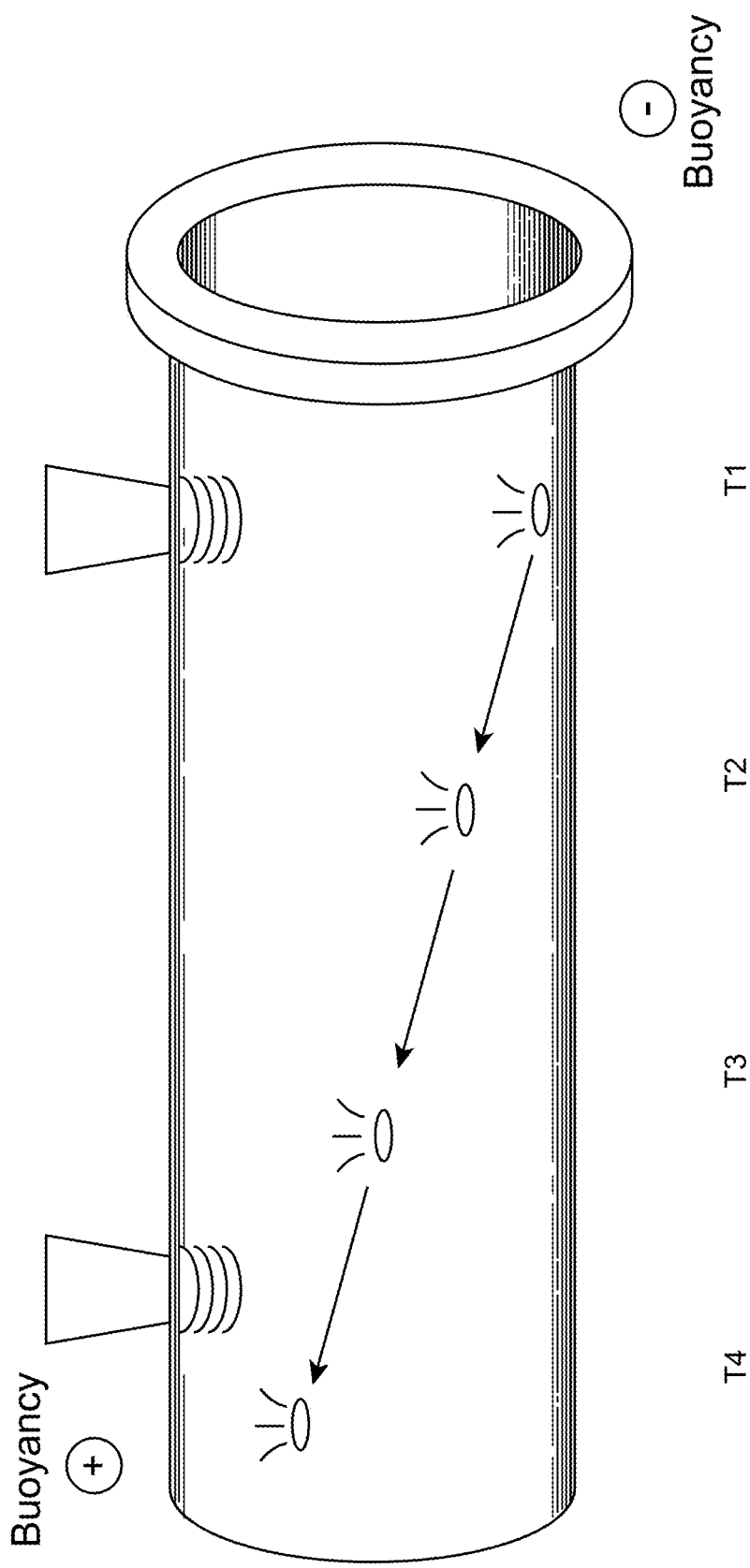
FIG. 5 illustrates a time-lapse sequence of an exemplary sensor pod having increased buoyancy as it travels the length of a conduit.
Figure 6:
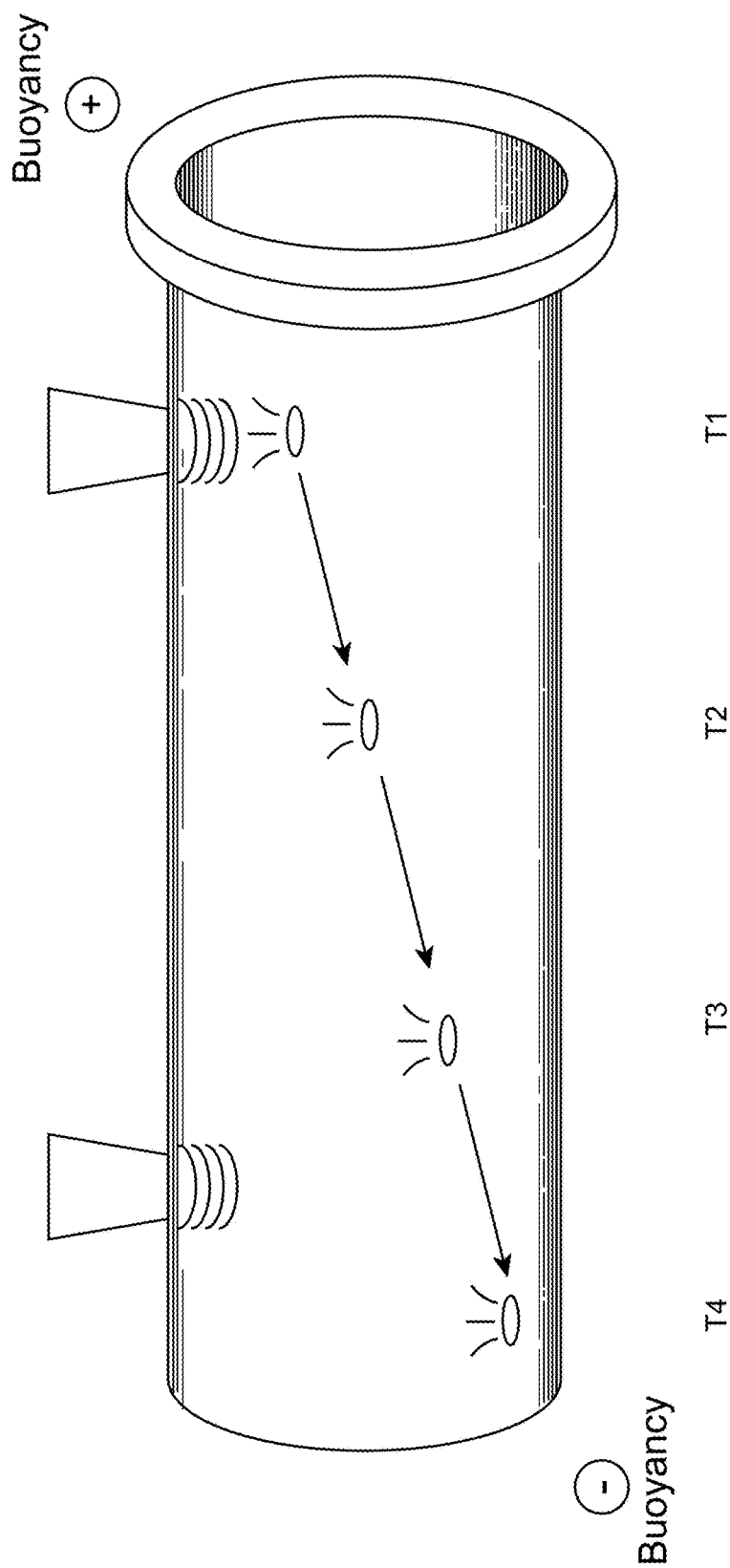
FIG. 6 illustrates a time-lapse sequence of an exemplary sensor pod having decreased buoyancy as it travels the length of a conduit.

Tailored buoyancy allows a conduit to be seeded with pods 14 that either travel within the fluid stream (neutral buoyancy), float on the surface of the fluid stream (positive buoyancy), or sink at the bottom of the fluid stream (negative buoyancy). Depending upon the conduit and fluid medium, variable buoyancy may also be of interest as shown in the sensor pod 14 of FIGS. 4-6. Variable buoyancy can be achieved by packaging the sensor pod 14 in a manner that includes ballast 20 that dissolves in the fluid over time. The rate at which the ballast dissolves controls the pod's buoyancy over time. Note that in the embodiment of FIG. 4, there is no casing 18 present as in FIG. 3. Beginning with negative or neutral buoyancy, the pod 14 may become more positively buoyant as the ballast 20 dissolves (FIG. 5). Alternately, beginning with positive buoyancy, the pod 14 may become more negatively buoyant as the ballast 20 dissolves (FIG. 6). The ballast 20 can be made of any material that is soluble in the fluid itself. A high solubility material will dissolve at a faster rate than a low solubility material and the buoyancy rate will similarly be faster with the high solubility material. Examples of soluble materials for use as ballast 20 include salts, detergents, and sugars.

It is highly desirable to not only detect and locate conduit breaches but to repair them as well. The package casing 18 may also include the ability for tags 10 and pods 14 to agglomerate or cluster together at a conduit breach, ultimately forming a patch in a similar manner to how blood platelets inhibit blood from escaping the human body at a wound. Several technologies exist that employ polymeric materials to repair a puncture in a vehicle's tire or a corrosion breach in a refrigeration system. These technologies employ liquid suspensions that act very much like the blood platelet process. In this patent application, the role of the platelets are provided by the tags 10 and pods 14 themselves and the flowing medium would be the fluid flowing in the conduit.

While this disclosure describes and enables several examples of a conduit breach detection and location system, other examples and applications are contemplated. Accordingly, the invention is intended to embrace those alternatives, modifications, equivalents, and variations as fall within the broad scope of the appended claims. The technology disclosed and claimed herein may be available for licensing in specific fields of use by the assignee of record.

What is claimed is:

1. A system for detecting and locating a breach or an obstruction in a conduit that is carrying a fluid medium, the system comprising:
   a plurality of uniquely identifiable Radio Frequency (RF) tags for introducing into the conduit at an upstream point, each uniquely identifiable RF tag of said plurality of uniquely identifiable RF tags included within a sensor pod having a tailored size for effectively determining a size of the breach or the obstruction and a sensor also included within the respective sensor pod for measuring a flow velocity of the fluid medium;
   a first transceiver, said first transceiver being disposed on the outside of the conduit and proximate to the upstream point;

a second transceiver, said second transceiver being disposed on the outside of the conduit and proximate to a downstream point, the downstream point located downstream of the upstream point in the direction that the fluid medium is flowing; and wherein each respective uniquely identifiable RF tag of said plurality of uniquely identifiable RF tags communicate individually with said first transceiver and only the uniquely identifiable RF tags that pass through the conduit without encountering the breach or the obstruction communicate individually with said second transceiver such that the uniquely identifiable RF tags that do not communicate with said second transceiver and the tailored size of their respective sensor pods, in combination, provide an approximate size of the breach or the obstruction in the conduit and the flow velocity measurement provides a speed and a direction component of the fluid medium in the conduit.

2. The breach detection system as recited in claim 1 and further comprising a pipeline inspection gauge (pig) having a third transceiver for introducing into the upstream point of the conduit for locating the uniquely identifiable RF tags that have encountered the breach or the obstruction in the conduit.

3. The breach detection system as recited in claim 1 wherein each respective sensor pod further includes a ballast that varies a buoyancy of said respective sensor pod in the fluid medium over time.

4. The breach detection system as recited in claim 3 wherein the ballast is configured to provide increased buoyancy over time.

5. The breach detection system as recited in claim 3 wherein the ballast is configured to provide decreased buoyancy over time.

6. A method of detecting and locating a breach or an obstruction in a conduit carrying a fluid medium comprising the steps of:
  a. locating a first transceiver proximate to an upstream point;
  b. locating a second transceiver proximate to a downstream point, the downstream point being located downstream of the upstream point in the direction that the fluid medium flows;
  c. introducing a plurality of uniquely identifiable Radio Frequency (RF) tags into the fluid medium at the upstream point, each respective uniquely identifiable RF tag of said plurality of uniquely identifiable RF tags included within a sensor pod having a tailored size for effectively determining the size of the breach or the obstruction and a sensor also included within the respective sensor pod for measuring a flow velocity of the fluid medium;
  d. communicating with each respective uniquely identifiable RF tag of said plurality of uniquely identifiable RF tags with said first transceiver at a first time;
  e. communicating with the uniquely identifiable RF tags that pass through the conduit without encountering the breach or the obstruction with said second transceiver at a second time that is later than the first time; and
  f. comparing the communications of steps d) and e) to determine if any of the plurality of uniquely identifiable RF tags that were present at the upstream point are not present at the downstream point such that the uniquely identifiable RF tags that do not communicate with said second transceiver and the tailored size of their respective sensor pods, in combination, provide an approximate size of the breach or the obstruction in the conduit and the flow velocity measurement provides a speed and a direction component of the fluid medium in the conduit.

7. The method as recited in claim 6 further comprising the step of:
  g. introducing a pipeline inspection gauge (pig) having a third transceiver into the conduit to locate the uniquely identifiable RF tags that have encountered the breach or the obstruction in the conduit.

8. The method as recited in claim 6 wherein each respective sensor pod includes a ballast that varies a buoyancy of said respective sensor pod in the fluid medium over time.

9. The method as recited in claim 8 wherein the ballast is configured to provide increased buoyancy over time.

10. The method as recited in claim 8 wherein the ballast is configured to provide decreased buoyancy over time.

11. A conduit inspection system comprising:
a plurality of uniquely identifiable Radio Frequency (RF) tags that are introduced into a fluid medium within a conduit, each respective uniquely identifiable RF tag of said plurality uniquely identifiable RF tags included within a sensor pod having a tailored size, so that one or more of the plurality of uniquely identifiable RF tags encounters a breach in the conduit, and a sensor also included within the respective sensor pod for measuring a flow velocity of the fluid medium; and
wherein a transceiver communicates with the one or more of the uniquely identifiable RF tags that are lodged in the breach to determine the location and size of the breach and a speed and a direction component of the fluid medium.

* * * * *